United States Patent
Sazhin

(10) Patent No.: US 8,234,161 B1
(45) Date of Patent: Jul. 31, 2012

(54) SYSTEM AND METHOD FOR INTERNET COMMUNITY BUILDING, WEBSITE POPULARIZATION AND DISTRIBUTION OF E-COMMERCE PRODUCTS

(75) Inventor: Victor V. Sazhin, Moscow (RU)

(73) Assignee: Victor Sazhin Group Ltd., Tortola (VG)

( * ) Notice: Subject to any disclaimer, the term of this patent is extended or adjusted under 35 U.S.C. 154(b) by 1347 days.

(21) Appl. No.: 11/538,811

(22) Filed: Oct. 5, 2006

(51) Int. Cl.
*G06Q 30/00* (2012.01)

(52) U.S. Cl. .................. 705/14.12; 705/14.36

(58) Field of Classification Search .............. 705/14, 705/14.12, 14.36
See application file for complete search history.

(56) References Cited

U.S. PATENT DOCUMENTS

| | | | |
|---|---|---|---|
| 6,243,692 B1* | 6/2001 | Floyd et al. | 705/59 |
| 6,457,883 B1* | 10/2002 | Silverbrook et al. | 400/62 |
| 6,868,395 B1* | 3/2005 | Szlam et al. | 705/27 |
| 6,871,188 B2* | 3/2005 | De Souza | 705/27 |
| 6,898,572 B2* | 5/2005 | Ohyama | 705/14 |
| 6,980,962 B1* | 12/2005 | Arganbright et al. | 705/14.31 |
| 7,089,195 B2* | 8/2006 | Rosenberg | 705/14 |
| 7,158,943 B2* | 1/2007 | van der Riet | 705/14 |
| 7,366,996 B2* | 4/2008 | Hoyle | 715/854 |
| 7,392,481 B2* | 6/2008 | Gewickey et al. | 715/716 |
| 7,433,891 B2* | 10/2008 | Haber et al. | 1/1 |
| 7,437,368 B1* | 10/2008 | Kolluri et al. | 1/1 |
| 7,465,212 B2* | 12/2008 | Ganz | 446/175 |

* cited by examiner

*Primary Examiner* — James W Myhre
*Assistant Examiner* — Michael Goldman
(74) *Attorney, Agent, or Firm* — Bardmesser Law Group

(57) ABSTRACT

A method, system and computer program product for increasing popularity of a website including making agreements with vendors of product for distribution through the website; periodically making available the products on the website to all visitors of the website; and delivering the products to all visitors of the website. Visitors to the website can vote on selection of the product. The products can be made available as a daily reward. The products can be available for installation only for a limited period of time, and can include an installation wrapper with an unlocker that permits installation only for the limited period of time. The unlocker verifies with the server whether the product can be installed and activated, and can be a DLL, an executable file, an ACTIVE-X component, a registry settings file, and a cryptographic key.

21 Claims, 3 Drawing Sheets

SYSTEM AND METHOD FOR INTERNET COMMUNITY BUILDING, WEBSITE POPULARIZATION AND DISTRIBUTION OF E-COMMERCE PRODUCTS

BACKGROUND OF THE INVENTION

1. Field of the Invention

The present invention is related to internet commerce, and more particularly, to a system and method for increasing a popularity of a website.

2. Description of the Related Art

Generating traffic to a website is an issue that concerns many website owners. For example, many websites are supported by various forms of online advertising. Such advertising is generally dependent upon such factors as the number of page hits, the number of unique visitors to a site, the "stickiness" of the website, etc. Therefore, the owner of a website who wishes to increase the advertising revenue from third party online advertiser is faced with a problem of how to increase the number of visits from prior visitors ("stickiness"), how to increase the frequency of visits from a regular visitor base, how to generate new visitors, how to increase the number of partners/syndicators for purposes of content distribution, and how to increase the number of links to his site on other websites.

Accordingly, there is a need in the art for various mechanisms that increase the popularity of a particular website and build a community of regular website visitors.

SUMMARY OF THE INVENTION

Accordingly, the present invention is related to Internet community building and increasing popularity of websites that substantially obviates one or more of the disadvantages of the related art.

In one aspect, there is provided a method, system and computer program product for increasing popularity of a website including making agreements with vendors of product for distribution through the website; periodically making available the products on the website to all visitors of the website; and delivering the products to all visitors of the website. Visitors to the website can vote on selection of the product. The products can be made available as a daily prize or reward. A news feed to visitors to the website about the daily reward can be provided, such as an RSS feed or an ATOM feed, etc. As an option, paid subscription is required to be eligible for delivery of the product.

In another aspect, a method, system and computer program product for increasing the number of links to the internet site by offering other sites a partnership in terms of which users that came from particular partner site once will see the feeds of that partner being shown on the site. The period when partner feeds are shown is either limited or unlimited. The period when partner feeds are shown is either limited or unlimited. The feeds are shown until the partner site contains particular terms.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Figure 1:
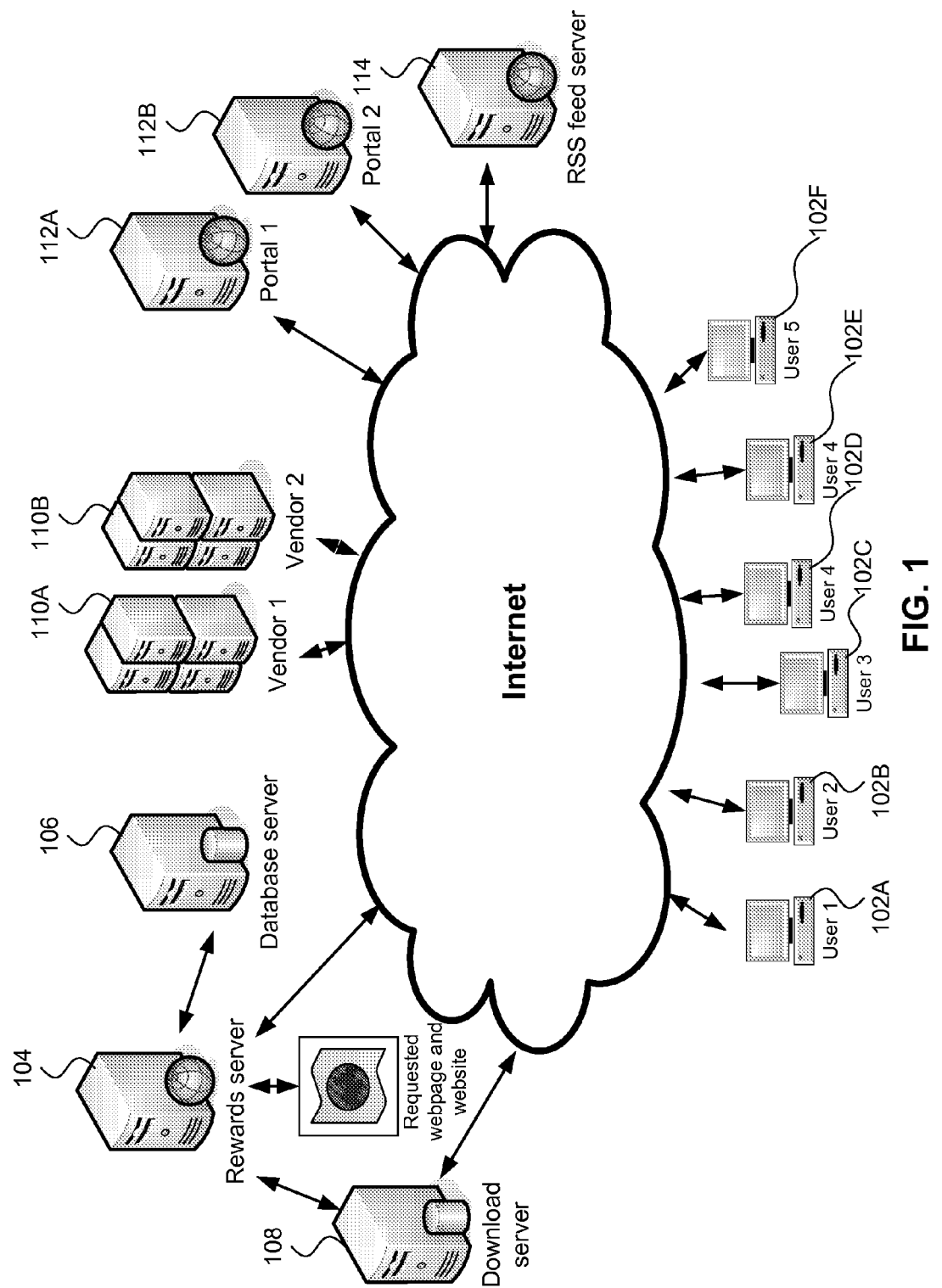
FIGS. 1-2 illustrate exemplary embodiments of the invention.

Reference will now be made in detail to the preferred embodiments of the present invention, examples of which are illustrated in the accompanying drawings.

The approach proposed herein involves offering to all visitors to a website certain rewards for doing so, where the rewards are offered regularly. For example, the rewards should preferably include such products whose marginal costs to produce is essentially close to zero. As one example, software is one such product, particularly where its distribution is online. In this example, all visitors to the website can be offered a free daily download of a particular software product, together with an activation key or other piece of information needed to activate that software. However, the rewards are typically of a nature that has real economic value to the user and for which the user would otherwise be expected to pay. Also, typically, the rewards are such that there are many readily available substitutes for these products—i.e., the products are not perceived as unique in the marketplace, and substitute products are available from many vendors.

In the preferred embodiment, this reward is offered on a daily basis. Empirically, this has been found to have the highest positive effect. Rewards offered less often than that, for example, once every two days or once a week, tend to be less effective, because many users tend to forget to visit the website, and lose interest. On the other hand, rewards offered more often than once a day, for example, twice daily, or three times daily, are most likely excessive, and, furthermore, might cause difficulties in finding a sufficient number of vendors willing to participate.

It should be further noted that for the software vendor, giving away free copies of the software to a particular website visitor most likely does not represent a significant loss in revenue, because very rarely does the audience visiting the website and the typical market for the product overlap 100%—in many cases, the "opportunity cost" in terms of customers who otherwise would buy the software can be kept down to, for example, a fraction of 1%. In the event that the number starts tending higher than that, the software vendor has the option of limiting the time duration that the software can be active—for example, to one year, and then require an update for which the user would have to pay. Furthermore, there is a certain publicity and advertising value in having an additional distribution channel for the software, particularly where the distribution channel is perceived to be free by the consumers. It should be kept in mind that the typical product is one with many substitutes—thus, even if the user were to buy a similar product, it would not necessarily be THIS vendor's product—thus, the vendor's potential losses are likely quite small.

Also, the vendors can have other products (not featured as the rewards) on the website, and this provides additional exposure to the customers/visitors, and an additional brand building opportunity. Further still, the vendors can be provided with additional advertising options on the site, whether in the form of conventional advertising (e.g., banners, etc.), or in the form of exposure/discussion/publicity on the website, for example, on the webpage devoted to the particular reward.

It should also be noted that online advertising by third party advertisers tends to be non-linearly related to the number of visitors to a website. Less popular websites, for example, with fewer than 100,000 visitors per day, tend to attract very little advertising, unless the website is geared towards some very specific and relatively narrow market. However, once the number of visitors exceeds roughly 100,000 per day, the amount of money that advertisers are willing to spend on that website increases dramatically. Thus, the present invention is particularly advantageous in that by giving away free rewards, the number of visitors can very rapidly increase—while the cost of the rewards essentially remain close to zero, since the marginal costs to produce an extra N copies of the software is essentially zero.

As yet another option, the website that, in this example, gives away rewards to all visitors, can require a subscription, and ultimately a paid subscription—thereby generating an additional revenue stream for the owner of the website.

As yet a further embodiment, the visitors to the website can be given the option to select which products they would like to see as rewards, for example, through some form of a forum, a blog, or by voting on products and/or product categories.

Furthermore, the website can participate in exchanges with other websites—for example, exchanges of visitors, exchanges of links, other websites can add referrer blocks to their webpages (e.g., RSS feeds, XML feeds, ATOM feeds, javascript blocks, dynamic images), such that those referrer blocks will link back to this website; sites that provide referrals can themselves be rewarded (for example, by featuring them on this website, by paying them for it, and so on), etc. As a further alternative, the feed can be given to software publishers to display in their products, or it can be displayed in the downloadable software itself or its wrapper. The site itself or its partners can supply visitors with a download manager that shows such a feed. As yet another option, daily email notifications to the users can be provided.

Also, the website can provide blocks that others can place on their own websites (either for free, as many portals do to increase traffic to their own sites by placing such blocks on people's homepages, or as a paid service, where the portal pays the owners of the homepages). Also, the partner websites can give the download links directly, sharing the advertising revenue.

As yet a further option, the website can provide a feed, such as an RSS feed, where the user can install software on his computer, so that the user can constantly stay informed of the reward that is being offered on that date. This may be particularly useful where not every reward that is offered is of interest to every visitor. As yet a further option, several rewards may be offered, with the user selecting one out of several for his download. Furthermore, it is possible to widen the scope of the syndication, by eliminating the need to refer to this site, but place direct links to the files being downloaded on other portals (such as on Yahoo!, Google, MSN, etc.) (in the case of such downloadable files representing rewards/content), while the portal would share the advertising revenue with the website or directly pay the website owner.

As further options, the software products that are provided as rewards might, or might not include support—which means, if there is no support included, the costs to the vendor are lower, and the opportunities for subsequent sales and interaction with the customer and upgrades greater. In other words, the product provided as a reward need not be identical to what is available simply as a purchase. This situation should also be distinguished from a version that is provided for download that only works for a limited time—in this case, the product can work indefinitely. Also, this situation should be distinguished from providing a trial version—the typical product would be a fully functional one, but not necessarily with all the features and services, such as support and lifetime upgrades that are provided as part of the purchase price.

As yet a further option, an activation key can be provided that is effective only for a limited time (e.g., the user is able to unlock and install the program only "today," i.e., the day of the download or only within two days of the download, etc.), and not on any later date, so that the vendor can be certain that customers do not search for the reward product on a later date on the website (after the key is activated the program will be unlocked and can work without time limitations).

As yet a further option, in order to more effectively cross-promote a particular vendor's other products (in other words, products that are currently not featured as rewards), it is possible to create a special advertising wrapper for the downloaded software product. This wrapper, in addition to, or instead of, installation of the product itself, can show various forms of advertising of the other products, including various audio visual content, advertising the rewards website itself, various other services available on the website and/or from the vendor, and so on. Also, these ads can be periodically shown during the operation of the software that was downloaded as a reward—in essence, the user being "subjected" to this advertising is the price of getting a free software product that nonetheless has economic value to the user. As yet another option, these ads can be disabled by user, either after a specified amount of time, or, immediately, or, optionally, by paying a fee (as the price for a product that, without advertising, is no longer "free"). This can be done, for example, by the user checking a checkbox. Note that even if the user disables the advertising, he would still see an advertising the first time the software is installed—so the vendor has, at a minimum, at least one opportunity to cross-promote his other products.

As yet a further option, an installation wrapper can be provided, that includes the unlocker (which can be a cryptographic key, a DLL, an ACTIVE-X component an executable file, a set of register settings, etc.), such that the installation wrapper verifies that the software/unlocker can be installed within a specified amount of time, by getting a decryption key for the content from the rewards server, which is only available from the server for a limited amount of time—the software itself can be a full-featured version that doesn't require a separate key, or a less than full-featured version, however, the authorization for installation is supplied by using the wrapper.

Alternatively as either an additional or an exclusive method of limiting the time during which the full version of the product can be installed, in cases when the software requires online activation from its publisher site, the users can be supplied with a serial number or a program version which will be only valid for activation during the limited amount of time—in this case, it is controlled by the publisher.

Note also that the same or different wrappers can be used for cross-promotion of other products of the same vendor, e.g., by displaying links and images advertising the vendor's other products, as well as for installation. As yet a further option, two or more such wrappers can be used, e.g., a wrapper-within-a-wrapper. As yet a further option, the functionality of the wrapper(s) can be integrated into the products themselves, for example, as a separate build.

The advertising wrapper can also be used for rewarding the partner web sites that will provide newsfeeds to users or links to the rewards server. Thus, the server can remember (e.g., by setting cookies in the visitor's browser) that the visitor came from a particular site (by analyzing the "referrer" header of browser request or by providing partners with customized links that include partner ID information), and then provide users with customized version of wrapped software so that the users will see not only the cross-promotion of developer products and server advertisement, but also advertisement of the partner. The ad serving can done either by the rewards server, or by a third party ad server.

As another option partners, can be rewarded by a banner or other kinds of web advertisements that can be shown on the rewards server to a user (who came from the partner site once) any time he visits the server. If the visitor comes from a different partner's website, then ads for that partner would be shown. As another option, the feed (e.g., an RSS feed) of the partner site can be shown as well. This can be implemented, for example, by using cookies on the user's browser side and by using server-side database of partner sites and their RSS feeds. Thus, since the server will have greater user retention than the average Internet site (and the average partner site), the partners will be benefited from transferring their visitors to the rewards server because of such lifetime (or limited time) ads. For example, one such ad can be a banner "First time you visited us from PARTNER." Another example can be in-wrapper advertising as "In assistance with PARTNER"—with links to partner site, where PARTNER refers to partner site's name.

Figure 2:
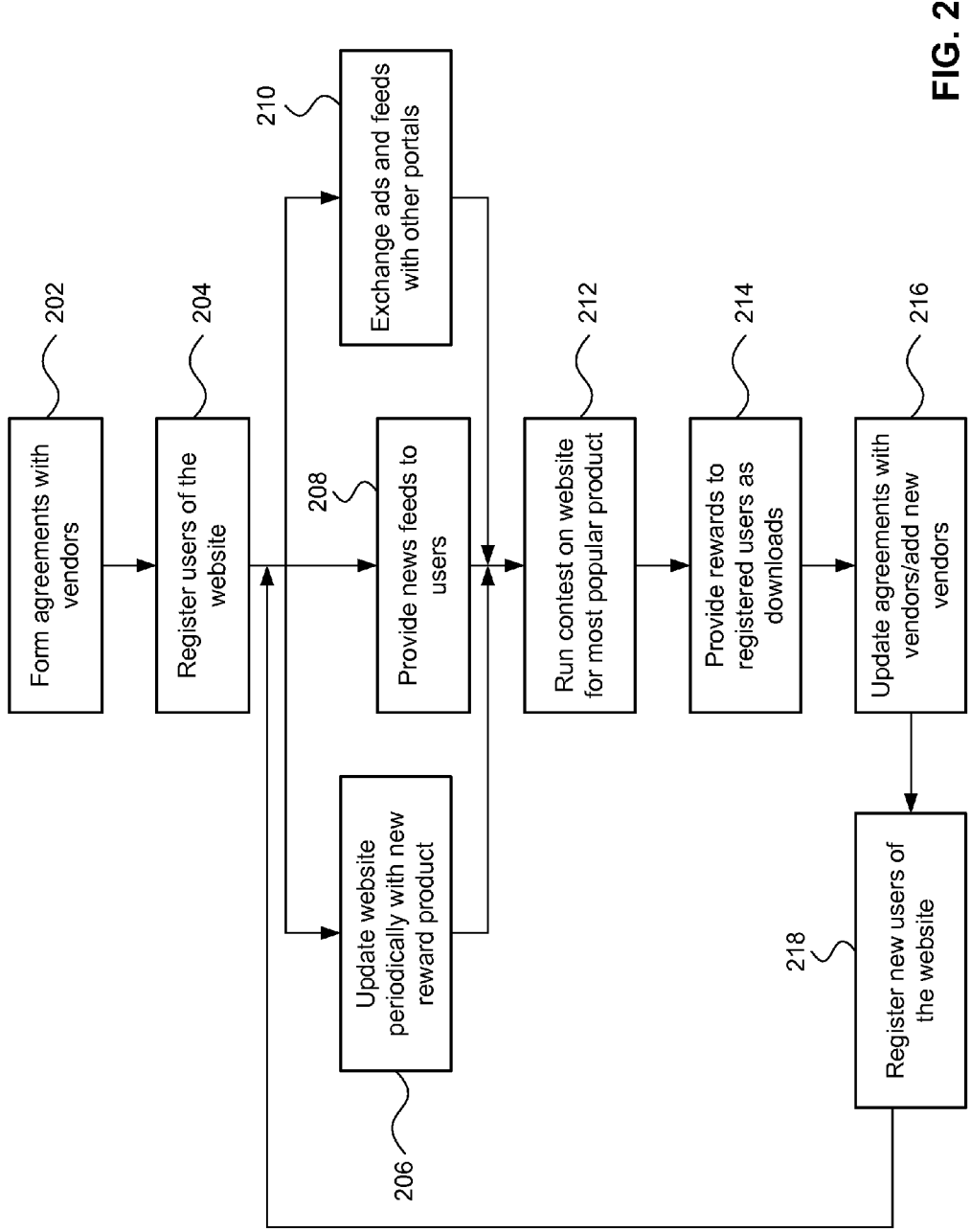

FIGS. 1-2 illustrate various embodiments of the invention. FIG. 1 illustrates the various elements that interact, in one embodiment of the invention. As shown in FIG. 1, a number of users 102A-102F are connected to the internet, requesting or accessing a website from a rewards server 104. The server 104 provides the webpage to the users 102. The information about the users is maintained on a database server 106, which physically can be the same server as the reward server 104, or can be a different server. The reward server 104 is connected, either directly or through the internet to vendors 110A, 110B, which provide the software download products. The products can be downloaded either directly from the vendors 110, or from a dedicated download server 108. Portals 112A, 112B can exchange traffic, links, and blocks, and other "items" of value, as far as the owner of the rewards server 104 is concerned. Also, a feed server 114, such as RSS, ATOM, etc. can provide feeds to the users 102, either directly, or the script can be incorporated into the server 104 software.

FIG. 2 illustrates in flowchart form one example of how the invention can operate. As shown in FIG. 2, the owner of the rewards server 104 makes agreements with vendors, such as software vendors 110. Users 102A are registered, see step 204 (note that registration is optional). The rewards server 104 periodically updates the website with new product or products, see 206. Also, the server 104, either directly, or using other servers 114 can provide news feeds to the users 102 (see 208). Also, the rewards server 104 can exchange various "items" of value with other portals 112, and/or other partner websites (see 210). The rewards server 104 periodically runs contest on the website, to see which software is most popular, for example, by letting users vote on their rewards they prefer (step 212, which is optional). In step 214, the rewards server makes the rewards available to the users 102 for downloads. In step 216, the rewards server periodically updates agreements with the vendors, adds and deletes vendors, as necessary. In step 218, new users can be registered, and, optionally, inactive users can be reminded. The process then cycles, as shown in FIG. 2.

Figure 3:
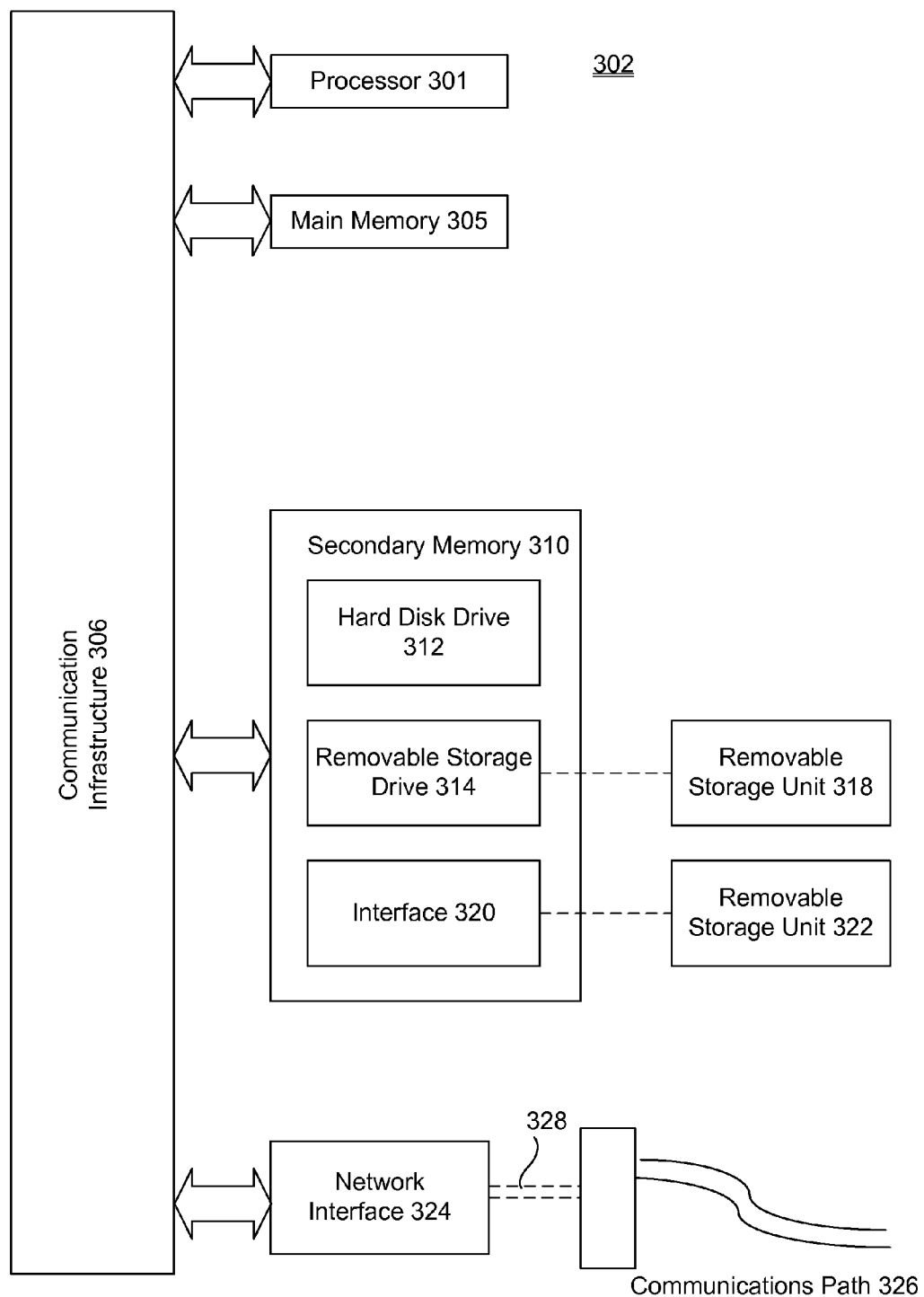
FIG. 3 illustrates an exemplary computer system on which the invention may be implemented.

An example of the computing system 302 on which the technology described above can be implemented is illustrated in FIG. 3. The computing system 302 includes one or more processors, such as processor 301. The processor 301 is connected to a communication infrastructure 306, such as a bus or network. Various software implementations are described in terms of this exemplary computer system. After reading this description, it will become apparent to a person skilled in the relevant art how to implement the invention using other computer systems and/or computer architectures.

Computing system 302 also includes a main memory 308, preferably random access memory (RAM), and may also include a secondary memory 310. The secondary memory 310 may include, for example, a hard disk drive 312 and/or a removable storage drive 314, representing a magnetic tape drive, an optical disk drive, etc. The removable storage drive 314 reads from and/or writes to a removable storage unit 318 in a well known manner. Removable storage unit 318 represents a magnetic tape, optical disk, or other storage medium that is READ by and written to by removable storage drive 314. As will be appreciated, the removable storage unit 318 can include a computer usable storage medium having stored therein computer software and/or data.

In alternative implementations, secondary memory 310 may include other means for allowing computer programs or other instructions to be loaded into computing system 302. Such means may include, for example, a removable storage unit 322 and an interface 320. An example of such means may include a removable memory chip (such as an EPROM, or PROM) and associated socket, or other removable storage units 322 and interfaces 320 which allow software and data to be transferred from the removable storage unit 322 to computing system 302.

Computing system 302 may also include one or more communications interfaces, such as communications interface 324. Communications interface 324 allows software and data to be transferred between computing system 302 and external devices. Examples of communications interface 324 may include a modem, a network interface (such as an Ethernet card), a communications port, a PCMCIA slot and card, etc. Software and data transferred via communications interface 324 are in the form of signals 328 which may be electronic, electromagnetic, optical or other signals capable of being received by communications interface 324. These signals 328 are provided to communications interface 324 via a communications path (i.e., channel) 326. This channel 326 carries signals 328 and may be implemented using wire or cable, fiber optics, an RF link and other communications channels. In an embodiment of the invention, signals 328 comprise data packets sent to processor 301. Information representing processed packets can also be sent in the form of signals 328 from processor 301 through communications path 326.

The terms "computer program medium" and "computer usable medium" are used to generally refer to media such as removable storage units 318 and 322, a hard disk installed in hard disk drive 312, and signals 328, which provide software to the computing system 302.

Computer programs are stored in main memory 308 and/or secondary memory 310. Computer programs may also be received via communications interface 324. Such computer programs, when executed, enable the computing system 302 to implement the present invention as discussed herein. In particular, the computer programs, when executed, enable the processor 301 to implement the present invention. Where the invention is implemented using software, the software may be stored in a computer program product and loaded into computing system 302 using removable storage drive 314, hard drive 312 or communications interface 324.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A method of increasing popularity of a website, the method comprising:
    making agreements with vendors of executable software products for free distribution through the website, wherein the products are otherwise available only by purchasing the products for money;
    periodically making available the products on the website to all visitors of the website, wherein new products are available on a daily basis as a daily reward; and
    delivering the products to visitors of the website,
    wherein the products are available for installation only for a limited period of time, and
    wherein the products include an installation wrapper with an unlocker that permits installation only for the limited period of time.

2. The method of claim 1, further comprising providing a news feed to visitors to the website about new daily rewards.

3. The method of claim 2, wherein the news feed is an RSS (Really Simple Syndication) feed.

4. The method of claim 2, further comprising providing a news feed to other portals about the new daily rewards.

5. The method of claim 2, further comprising providing a feed block to other websites about the new daily rewards.

6. The method of claim 2, wherein the news feed is provided on the user side as part of the download manager.

7. The method of claim 2, wherein the news feed is provided to the visitors as part of third party downloadable applications included in the products.

8. The method of claim 7, wherein visitors to the website vote on selection of the product.

9. The method of claim 8, wherein the products of a particular vendor are downloaded together with an advertising wrapper that is used for cross-promoting other products of that vendor.

10. The method of claim 9, wherein the wrapper includes an option for the user to turn off advertising.

11. The method of claim 2, wherein the news feed is provided on the user side as part of the products.

12. The method of claim 1, wherein subscription is required for the visitor to be eligible for delivery of the product.

13. The method of claim 12, wherein the subscription is a paid subscription.

14. The method of claim 1, wherein the unlocker verifies with the server whether the product can be installed and activated.

15. The method of claim 14, wherein the unlocker is any of a DLL (Dynamic Linked Library), an executable file, a registry settings file, an Active-X component and a cryptographic key.

16. The method of claim 1, wherein a server that maintains the website provides advertising for partner websites that referred visitors to the website.

17. The method of claim 1, wherein the advertising is generated by the server.

18. The method of claim 1, wherein the advertising is generated by a third party ad server.

19. The method of claim 1, wherein the products of a particular vendor are downloaded together with an advertising wrapper that is used for promoting a partner website that referred that visitor.

20. The method of claim 1, wherein the limited period of time is one day.

21. A system for increasing popularity of a website, the system comprising:
    a server making executable software products available for free distribution through the website, wherein the products are otherwise available only by purchasing the products for money and new executable software products are available on a daily basis as a daily reward;
    a database of visitors to the website to whom he the products are made available;
    a list of vendors providing the products maintained by the server; and
    wherein the server delivers the products to visitors of the website through the Internet
    wherein the products are available for installation only for a limited period of time, and
    wherein the products include an installation wrapper with an unlocker that permits installation only for the limited period of time.

* * * * *